United States Patent
Liu et al.

(10) Patent No.: US 11,366,510 B2
(45) Date of Patent: Jun. 21, 2022

(54) PROCESSING METHOD FOR REDUCING POWER CONSUMPTION AND MOBILE TERMINAL

(71) Applicant: VIVO MOBILE COMMUNICATION CO., LTD., Chang'an Dongguan (CN)

(72) Inventors: Xudong Liu, Chang'an Dongguan (CN); Xiang Dai, Chang'an Dongguan (CN)

(73) Assignee: VIVO MOBILE COMMUNICATION CO., LTD., Guangdong (CN)

( * ) Notice: Subject to any disclaimer, the term of this patent is extended or adjusted under 35 U.S.C. 154(b) by 5 days.

(21) Appl. No.: 16/955,302

(22) PCT Filed: Dec. 7, 2018

(86) PCT No.: PCT/CN2018/119691
§ 371 (c)(1),
(2) Date: Jun. 18, 2020

(87) PCT Pub. No.: WO2019/120087
PCT Pub. Date: Jun. 27, 2019

(65) Prior Publication Data
US 2021/0011541 A1 Jan. 14, 2021

(30) Foreign Application Priority Data
Dec. 21, 2017 (CN) .......................... 201711392218.6

(51) Int. Cl.
*G06F 1/32* (2019.01)
*G06F 1/3287* (2019.01)

(52) U.S. Cl.
CPC ................. *G06F 1/3287* (2013.01)

(58) Field of Classification Search
CPC ..................................... C06F 1/3287
See application file for complete search history.

(56) References Cited

U.S. PATENT DOCUMENTS

2013/0084922 A1 4/2013 Liu et al.
2013/0290761 A1 10/2013 Moon et al.
(Continued)

FOREIGN PATENT DOCUMENTS

CN 103299256 A 9/2013
CN 104503565 A 4/2015
(Continued)

OTHER PUBLICATIONS

International Search Report & Written Opinion related to Application No. PCT/CN2018/119691; dated Jul. 2, 2020.
(Continued)

*Primary Examiner* — Stefan Stoynov
(74) *Attorney, Agent, or Firm* — von Briesen & Roper, s.c.

(57) ABSTRACT

A processing method for reducing power consumption and a mobile terminal are provided. The method includes: controlling a sensor coprocessor to enter a dormant state, in a case that the mobile terminal is in a screen-off state; receiving a trigger instruction transmitted by a touch screen coprocessor, wherein the trigger instruction is transmitted when data collected by a sensor connected to the touch screen coprocessor meets a predetermined trigger condition; and controlling the mobile terminal to perform a function corresponding to the trigger s action.

11 Claims, 3 Drawing Sheets

(56) References Cited

U.S. PATENT DOCUMENTS

| | | | |
|---|---|---|---|
| 2014/0013143 A1 | 1/2014 | Park et al. | |
| 2014/0149754 A1 | 5/2014 | Silva et al. | |
| 2015/0301588 A1 | 10/2015 | Jeong et al. | |
| 2016/0209907 A1* | 7/2016 | Han | G06F 1/329 |
| 2016/0370838 A1 | 12/2016 | Gu et al. | |
| 2018/0300529 A1 | 10/2018 | Zuo et al. | |
| 2018/0365086 A1 | 12/2018 | Zhong et al. | |

FOREIGN PATENT DOCUMENTS

| | | |
|---|---|---|
| CN | 104503691 A | 4/2015 |
| CN | 104516472 A | 4/2015 |
| CN | 104657057 A | 5/2015 |
| CN | 105700668 A | 6/2016 |
| CN | 105740002 A | 7/2016 |
| CN | 105872976 A | 8/2016 |
| CN | 106197468 A | 12/2016 |
| CN | 107223232 A | 9/2017 |
| CN | 107277904 A | 10/2017 |
| CN | 108108007 A | 6/2018 |
| WO | 2017213358 A1 | 12/2017 |

OTHER PUBLICATIONS

Chinese Office Action for related Chinese Application No. 201711392218.6; dated Jun. 11, 2019.
Chinese Search Report for related Application No. 201711392218.6; dated Nov. 15, 2018.
Extended European Search Report for related Application No. 18890600.2; dated Dec. 11, 2020.

* cited by examiner

PROCESSING METHOD FOR REDUCING POWER CONSUMPTION AND MOBILE TERMINAL

CROSS-REFERENCE TO RELATED APPLICATION

This patent application is a 35 USC § 371 U.S. national stage of International Application No. PCT/CN2018/119691 filed on Dec. 7, 2018, which claims a priority to Chinese Patent Application No. 201711392218.6 filed on Dec. 21, 2017 both disclosures of which is are incorporated in their entireties by reference herein.

TECHNICAL FIELD

The present disclosure relates to the field of communication technologies, and in particular to a processing method for reducing power consumption and a mobile terminal.

BACKGROUND

With the development of science and technology, mobile terminals such as smartphones have become more and more important in peoples lives. In order to better establish a relation between mobile terminals and users, more and more sensors, such as distance sensors and motion sensors, have been installed on a mobile terminal.

In the related art, in order to enable a mobile terminal to acquire and process sensor data in an always-on-display state, a sensor coprocessor is generally integrated in the mobile terminal, and the sensor data is acquired and processed by the sensor coprocessor, so as to meet usage requirements of users when the mobile terminal is in the always-on-display state. However, in the always-on-display state, there is a problem that the sensor coprocessor in operating consumes large electricity, which may accelerate power consumption of the mobile terminal in the always-on-display state.

In view of the above, the mobile terminal in the related art has a problem of high power consumption in processing sensor data using a sensor coprocessor when the mobile terminal is in the always-on-display state.

SUMMARY

Embodiments of the present disclosure provide a processing method for reducing power consumption and a mobile terminal, so as to solve a problem in the related art of a high power consumption in processing data from a sensor by using a sensor coprocessor when the mobile terminal is in a screen-off state.

To solve the above technical problem, the present disclosure is implemented as follows.

In a first aspect, embodiments of the present disclosure provide a processing method for reducing power consumption, which is applied to a mobile terminal including a sensor, a touch screen coprocessor and a sensor coprocessor. The sensor is connected to the touch screen coprocessor and the sensor coprocessor, and an operating power consumption of the touch screen coprocessor is lower than an operating power consumption of the sensor coprocessor. The method includes:

controlling the sensor coprocessor to enter a dormant state, in a case that the mobile terminal is in a screen-off state;

receiving a trigger instruction transmitted by the touch screen coprocessor, where the trigger instruction is transmitted when data collected by the sensor connected to the touch screen coprocessor meets a predetermined trigger condition; and controlling the mobile terminal to perform a function corresponding to the trigger instruction.

In a second aspect, embodiments of the present disclosure further provide a mobile terminal, including a sensor, a touch screen coprocessor and a sensor coprocessor. The sensor is connected to the touch screen coprocessor and the sensor coprocessor, and an operating power consumption of the touch screen coprocessor is lower than an operating power consumption of the sensor coprocessor. The mobile terminal further includes:

a first control module, configured to control the sensor coprocessor to enter a dormant state, in a case that the mobile terminal is in a screen-off state;

a first reception module, configured to receive a trigger instruction transmitted by the touch screen coprocessor, where the trigger instruction is transmitted when data collected by the sensor connected to the touch screen coprocessor meets predetermined trigger condition; and a second control module, configured to control the mobile terminal to perform a function corresponding to the trigger instruction.

In a third aspect, embodiments of the present disclosure further provide a mobile terminal including a processor, a memory and a computer program that is stored on the memory and executable on the processor. When executing the computer program, the processor is configured to implement steps of the processing method for reducing power consumption as described above.

In a fourth aspect, embodiments of the present disclosure further provide a computer-readable storage medium, having stored a computer program thereon. The computer program is executed by a processor to implement steps of the processing method for reducing power consumption as described above.

In the embodiments of the present disclosure, in a case that the mobile terminal is in a screen-off state, the sensor coprocessor is controlled to enter a dormant state; a trigger instruction transmitted by the touch screen coprocessor is received, where the trigger instruction is transmitted when data collected by the sensor connected to the touch screen coprocessor meets a predetermined trigger condition; and the mobile terminal is controlled to perform a function corresponding to the trigger instruction, this way, when the mobile terminal is in the screen-off state, as compared with using the sensor coprocessor with high operating power consumption to process data from the sensor, the operating power consumption of the mobile terminal in the screen-off state can be effectively reduced by controlling the touch screen coprocessor with low operating power consumption to process the data from the sensor, thereby extending the standby time of the mobile terminal in the screen-off state.

BRIEF DESCRIPTION OF THE DRAWINGS

In order to illustrate the technical solutions of some embodiments of the present disclosure in a clearer manner, drawings required for describing embodiments of the present disclosure will be briefly described hereinafter. Obviously, the drawings in the following description merely relate to some embodiments of the present disclosure, and based on these drawings, a person skilled in the art may obtain other drawings without creative efforts.

DETAILED DESCRIPTION

Technical solutions in embodiments of the present disclosure will be described hereinafter clearly and completely with reference to the drawings in some embodiments of the present disclosure. Obviously, the described embodiments are merely a part of, rather than all of, the embodiments of the present disclosure. Based on these embodiments of the present disclosure, all other embodiments obtained by persons of ordinary skill in the art without creative efforts shall fall within the protection scope of the present disclosure.

Figure 1:
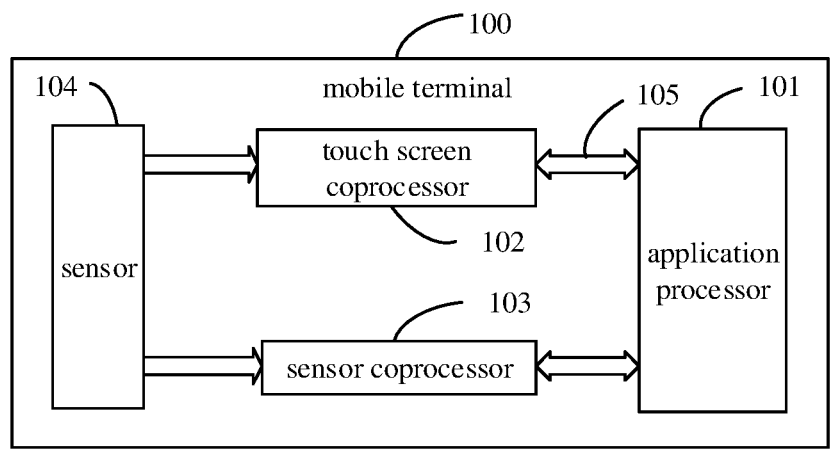
FIG. 1 is a structural block diagram of a mobile terminal according to an embodiment of the present disclosure.

Reference is made to FIG. 1, which is a structural block diagram of a mobile terminal according to an embodiment of the present disclosure. The mobile terminal 100 includes an application processor 101, a touch screen coprocessor 102, a sensor coprocessor 103, a sensor 104, and a communication bus 105. The sensor 104 is connected to the touch screen coprocessor 102 and the sensor coprocessor 103 through the communication bus 105. The touch screen coprocessor 102 and the sensor coprocessor 103 are further connected to the application processor 101 through the communication bus 105.

Specifically, the touch screen coprocessor 102 may be configured to process first data collected by the sensor 104 in accordance with a first control instruction of the application processor 101, and generate a corresponding first trigger instruction. The sensor coprocessor 103 may be also configured to process second data collected by the sensor 104 in accordance with a second control instruction of the application processor 101, and generate a corresponding second trigger instruction.

It should be noted that an operating power consumption of the touch screen coprocessor 102 is lower than that of the sensor coprocessor 103.

Figure 2:
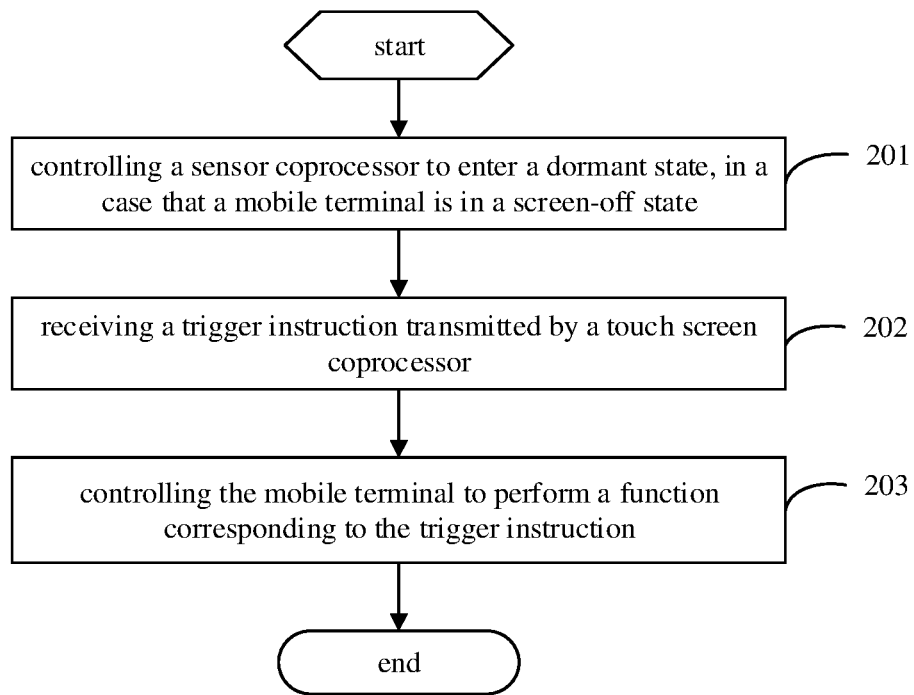
FIG. 2 is a flowchart of a processing method for reducing power consumption according to an embodiment of the present disclosure.

Reference is made to FIG. 2, which is a flowchart of a processing method for reducing power consumption according to an embodiment of the present disclosure. The method is applied to the mobile terminal as shown in FIG. 1. As shown in FIG. 2, the method includes the following steps.

Step 201 includes: controlling the sensor coprocessor to enter a dormant state, in a case that the mobile terminal is in a screen-off state.

In this step, in the process of using the mobile terminal, a screen-light-up state and a screen-off state are included. In a case that the mobile terminal is in the screen-light-up state, the sensor coprocessor may be controlled to process routine sensor data, such as sensor data collected by a step-counting sensor and speed data collected by a speed sensor. In a case that the mobile terminal processes data in the screen-off state, it is controlled that the sensor coprocessor enters the dormant state and the touch screen coprocessor processes the detected sensor data. Since the operating power consumption of the touch screen coprocessor is lower than that of the sensor coprocessor, by controlling the sensor coprocessor to enter the dormant state when the mobile terminal is in the screen-off state, and controlling the touch screen coprocessor to process the data detected by the sensor, the operating power consumption of the mobile terminal in the screen-off state can be effectively reduced, and the standby time of the mobile terminal in the screen-off state can be prolonged.

Step 202 includes: receiving a trigger instruction transmitted by the touch screen coprocessor.

In this step, the touch screen coprocessor is configured to process the data detected by the sensor when the mobile terminal is in the screen-off state, and generate a trigger instruction corresponding to the data detected by the sensor when the data detected by the sensor meets a predetermined condition. The touch screen coprocessor transmits the trigger instruction to the application processor of the mobile terminal, and the trigger instruction is generated according to the data detected by the sensor.

Step 203 includes: controlling the mobile terminal to perform a function corresponding to the trigger instruction.

In this step, the application processor may control the mobile terminal to perform the function corresponding to the trigger instruction, in accordance with the trigger instruction transmitted by the touch screen coprocessor.

For example, in a case that a mobile terminal plays a song in a screen-off state, when a user needs to switch or skip the song, the user may quickly shakes the mobile terminal to switch the song, where an acceleration sensor arranged on the mobile terminal may check the acceleration of the mobile terminal during shaking. If the acceleration acquired by the acceleration sensor, which is read by the touch screen coprocessor, is greater than a predetermined acceleration, the touch screen coprocessor generates a corresponding song switching instruction in response to the acceleration meeting a predetermined condition, and controls the mobile terminal to execute the song switching instruction, so as to switch songs.

Optionally, before the mobile terminal is in the screen-off state, the method further includes: receiving a setting instruction, where the setting instruction is used to instruct the mobile terminal to receive, by using the touch screen coprocessor, the data transmitted by the sensor when the mobile terminal is in the screen-off state.

In the present embodiments, in a case that the mobile terminal is in a screen-off state, it may be set by default that the data transmitted by the sensor is received by the touch screen coprocessor, or it may be set by a user that part of the data transmitted by the sensor is selectively transmitted to and processed by the touch screen coprocessor.

It should be noted that for platform suppliers of mobile terminals such as mobile phones in the market usually uses an integrated sensor coprocessor to process operation parameters detected by a sensor, and the sensor coprocessor may also be shared with an audio module. Since the integrated sensor coprocessor has high performance, there is a problem of high power consumption in the sensor coprocessor operating when the mobile terminal in a screen-off state.

A processor commonly used by a mobile phone supplier is used as an example. An operating frequency of a sensor coprocessor is about 660 MHz, and a peak value of an operating current of the sensor coprocessor is about 30 mA. However, when a current touch screen coprocessor operates at 100 Hz, an operating current can be controlled to be low than 1 mA. In order to reduce the power loss of the mobile terminal in the screen-off state, the touch screen coprocessor is used to process sensor data in the screen-off state, without additionally adding a low-power coprocessor, thereby achieving purposes of reducing power consumption and saving cost.

Optionally, the function corresponding to the trigger instruction is a screen-light-up function, and the controlling the mobile terminal to perform the function corresponding to the trigger instruction includes: controlling the mobile terminal to light up a screen.

In this embodiment, when the function corresponding to the trigger instruction is a screen-light-up function, the mobile terminal is controlled to light up the screen. The touch screen coprocessor needs to process user operation data in the screen-light-up state after the mobile terminal is in the screen-light-up state. In order to reduce the workload of the touch screen coprocessor in the screen-light-up state, the touch screen coprocessor is controlled to stop receiving the data transmitted by the sensor, and at the same time, the sensor coprocessor is controlled to enter an operating state, and receives and processes the data detected by the sensor. Therefore, usage requirements of users when the mobile terminal is in a screen-light-up state are satisfied.

In view of the above, according to the processing method for reducing power consumption, when the mobile terminal is in a screen-off state, as compared with using the sensor coprocessor with high operating power consumption to process data from the sensor, the operating power consumption of the mobile terminal in the screen-off state can be effectively reduced by controlling the touch screen coprocessor with low operating power consumption to process the data from the sensor, thereby extending the standby time of the mobile terminal in the screen-off state.

In embodiments of the present disclosure, the above method may be applied to a mobile terminal such as a mobile phone, a tablet personal computer, a laptop computer, a personal digital assistant (PDA), a mobile Internet device (MID), or a wearable device.

The processing method for reducing power consumption according to the embodiments of the present disclosure includes: controlling a sensor coprocessor to enter a dormant state in a case that the mobile terminal a screen-off state; receiving a trigger instruction transmitted by the touch screen coprocessor, where the trigger instruction is transmitted when data collected by the sensor connected to the touch screen coprocessor meets a predetermined trigger condition; and controlling the mobile terminal to perform a function corresponding to the trigger instruction. In such manner, when the mobile terminal is in the screen-off state, as compared with using the sensor coprocessor with high operating power consumption to process data from the sensor, the operating power consumption of the mobile terminal screen-off state can be effectively reduced by controlling the touch screen coprocessor with low operating power consumption to process the data from the sensor, thereby extending the standby time of the mobile terminal in the screen-off state.

Figure 3:
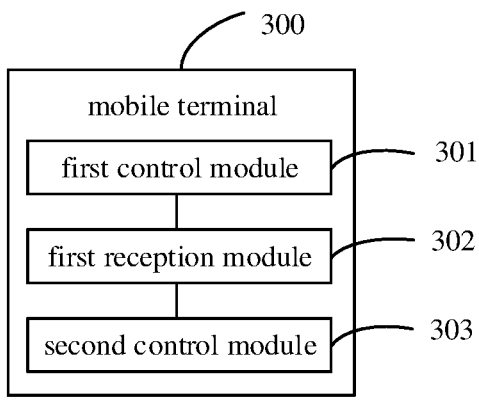
FIG. 3 is a first structural diagram of a mobile terminal according to an embodiment of the present disclosure.

Reference is made to FIG. 3, which is a structural diagram of a mobile terminal according to an embodiment of the present disclosure. As shown n FIG. 3, a mobile terminal 300 includes a first control module 301, a first reception module 302 and a second control module 303.

The first control module 301 is configured to control the sensor coprocessor to enter a dormant state, in a case that the mobile terminal is in a screen-off state.

The first reception module 302 is configured to receive a trigger instruction transmitted by the touch screen coprocessor, where the trigger instruction is transmitted when data collected by the sensor connected to the touch screen coprocessor meets a predetermined trigger condition.

The second control module 303 is configured to control the mobile terminal to perform a function corresponding to the trigger instruction.

Figure 4:
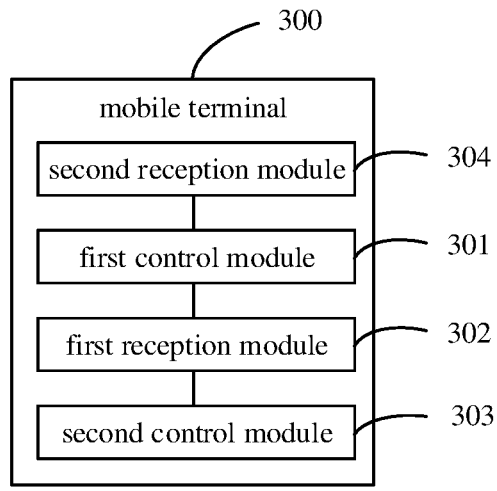
FIG. 4 is a second structural diagram of a mobile terminal according to an embodiment of the present disclosure.

Optionally, as shown in FIG. 4, the mobile terminal 300 further includes: a second reception module 304, configured to receive a setting instruction, where the setting instruction is used to instruct the mobile terminal to receive, by using the touch screen coprocessor, the data transmitted by the sensor when the mobile terminal is in the screen-off state.

Optionally, the function corresponding to the trigger instruction is a screen-light-up function, and the second control module 303 is specifically configured to control the mobile terminal to light up a screen.

Figure 5:
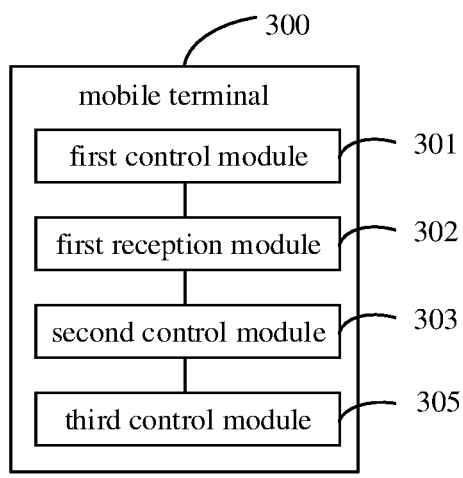
FIG. 5 is a third structural diagram of a mobile terminal according to an embodiment of the present disclosure.

Optionally, as shown in FIG. 5, the mobile terminal 300 further includes: a third control module 305, configured to control the touch screen coprocessor to stop receiving the data transmitted by the sensor.

Figure 6:
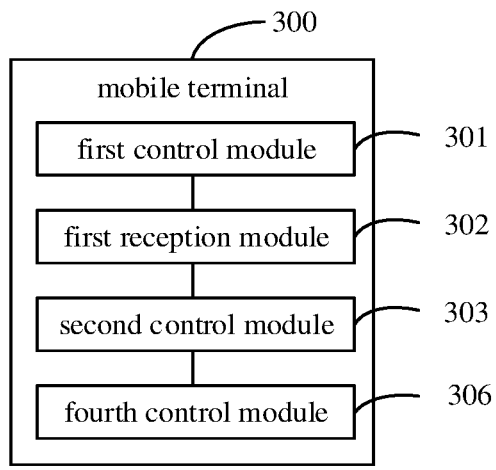
FIG. 6 is a fourth structural diagram of a mobile terminal according to an embodiment of the present disclosure.

Optionally, as shown in FIG. 6, the mobile terminal 300 further includes: a fourth control module 306, configured to control the sensor coprocessor to enter an operating state.

The mobile terminal 300 is capable of implementing various processes implemented by the mobile terminal in the above-described method embodiments. To avoid repetition, details are not described herein.

According to the embodiments of the present disclosure, the mobile terminal 300 controls the sensor coprocessor to enter a dormant state in a case that the mobile terminal is in a screen-off state, receives a trigger instruction transmitted by the touch screen coprocessor, which is transmitted when data collected by the sensor connected to the touch screen coprocessor meets a predetermined trigger condition, and controls the mobile terminal to perform a function corresponding to the trigger instruction. In this way, when the mobile terminal is in the screen-off state, as compared with using the sensor coprocessor with high operating power consumption to process data from the sensor, the operating power consumption of the mobile terminal in the screen-off state can be effectively reduced by controlling the touch screen coprocessor with low operating power consumption to process the data from the sensor, thereby extending the standby time of the mobile terminal in the screen-off state.

Figure 7:
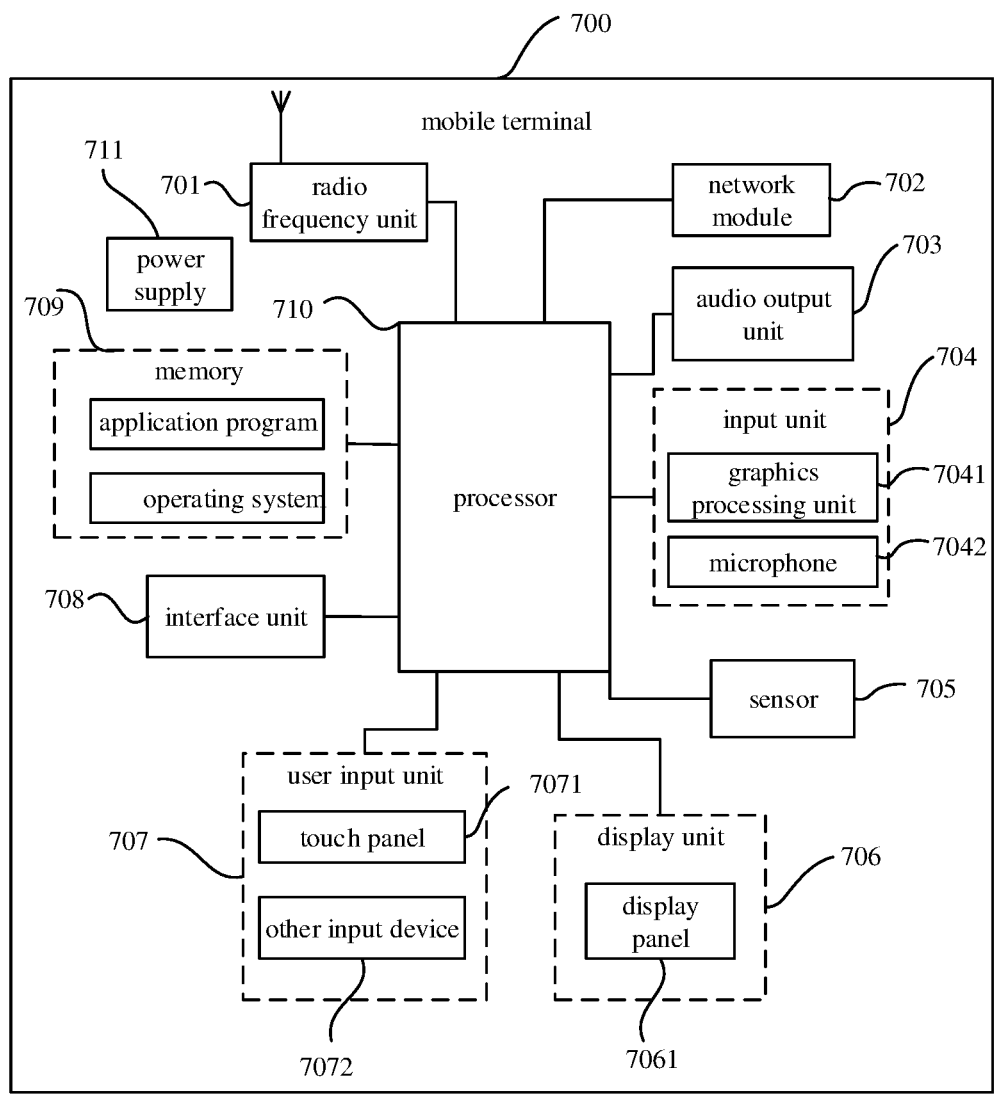
FIG. 7 is a structural diagram of a mobile terminal according to another embodiment of the present disclosure.

FIG. 7 is a schematic diagram of a hardware structure of a mobile terminal for implementing various embodiments of the present disclosure. As shown in FIG. 7, the mobile terminal 700 includes but not limited to: a radio frequency unit 701, a network module 702, an audio output unit 703, an input unit 704, a sensor 705, a display unit 706, a user input unit 707, an interface unit 708, a memory 709, a processor 710 and a power supply 711. Those skilled in the art may understand that the structure of the mobile terminal shown in FIG. 7 does not constitute a limitation on the mobile terminal, and the mobile terminal may include more or fewer components than those illustrated in FIG. 7, or may combine some of the components, or the components are arranged in a different manner. In embodiments of the present disclosure, the mobile terminal includes, but not limited to, mobile phones, tablet computers, notebook computers, palmtop computers, vehicle-mounted terminals, wearable devices, and pedometers.

The processor 710 is configured to: control the sensor coprocessor to enter a dormant state, in a case that the mobile terminal is in screen-off state; receive a trigger instruction transmitted by the touch screen coprocessor, where the trigger instruction is transmitted when data collected by the sensor connected to the touch screen coprocessor meets a predetermined trigger condition; and control the mobile terminal to perform a function corresponding to the trigger instruction.

Optionally, the processor 710 is further configured to receive a setting instruction, where the setting instruction is used to instruct the mobile terminal, by using the touch screen coprocessor, to receive the data transmitted by the sensor when the mobile terminal is in the screen-off state.

Optionally, the function corresponding to the trigger instruction is a screen-light-up function, and the processor 710 is further configured to control the mobile terminal to light up a screen.

Optionally, the processor 710 is further configured to control the touch screen coprocessor to stop receiving the data transmitted by the sensor.

Optionally, the processor 710 is further configured to control the sensor coprocessor to enter an operating state.

The mobile terminal 700 can implement various processes implemented by the mobile terminal in the foregoing embodiments. To avoid repetition, details are not described herein.

The mobile terminal 700 according to the embodiments of the present disclosure controls the sensor coprocessor to enter a dormant state, in a case that the mobile terminal is in a screen-off state, receives a trigger instruction transmitted by the touch screen coprocessor, which is transmitted when data collected by the sensor connected to the touch screen coprocessor meets a predetermined trigger condition, and controls the mobile terminal to perform a function corresponding to the trigger instruction. In this way, when the mobile terminal is in the screen-off state, as compared with using the sensor coprocessor with high operating power consumption to process data from the sensor, the operating power consumption of the mobile terminal in the screen-off state can be effectively reduced by controlling the touch screen coprocessor with low operating power consumption to process the data from the sensor, thereby extending the standby time of the mobile terminal in the screen-off state.

It should be understood that, in the embodiments of the present disclosure, the radio frequency unit 701 may be configured to receive and send information, or to receive and send signals during a call. Specifically, the radio frequency unit 701 delivers downlink information received from a base station to the processor 710 for processing, and transmits uplink data to the base station. Generally, the radio frequency unit 701 includes, but not limited to, an antenna, at least one amplifier, a transceiver, a coupler, a low noise amplifier, a duplexer, or the like. In addition, the radio frequency unit 701 may communicate with a network or other devices via a wireless communication system.

The mobile terminal provides users with wireless broadband Internet access via the network module 702, such as helping users send and receive emails, browse web pages and access streaming media.

The audio output unit 703 may convert audio data received by the radio frequency unit 701 or the network module 702 or stored in the memory 709 into audio signals and output them as sound. Moreover, the audio output unit 703 may provide audio output (for example, call signal reception sound, message reception sound, etc.) related to a specific function performed by the mobile terminal 700. The audio output unit 703 includes a speaker, a buzzer, a telephone receiver, or the like.

The input unit 704 is configured to receive audio or video signals. The input unit 704 may include a graphics processing unit (GPU) 7041 and a microphone 7042. The graphics processor 7041 is configured to process still pictures or image data of videos obtained via an image capture device (such as a camera) in an image capture mode or a video capture mode. The processed image frames may be displayed on the display unit 706. The image frames processed by the graphics processor 7041 may be stored in the memory 709 (or other storage medium) or transmitted via the radio frequency unit 701 or the network module 702. The microphone 7042 may receive sound, and may convert the sound into audio data. The processed audio data may be converted into a format that can be transmitted to a mobile communication base station for outputting via the radio frequency unit 701 in the case of a telephone call mode.

The mobile terminal 700 further includes at least one sensor 705, such as an optical sensor, a motion sensor, or other sensors. Specifically, the optical sensor includes an ambient light sensor and a proximity sensor. The ambient light sensor may adjust brightness of the display panel 7061 according to the brightness of the ambient light, and the proximity sensor may close the display panel 7061 and/or backlight when the mobile terminal 700 approaches to the ear. As a type of motion sensor, an accelerometer sensor may detect the magnitude of acceleration in various directions (usually three-axis directions), and detect the magnitude and direction of gravity when in the stationary state. The accelerometer sensor may be applied to identify the pose of the mobile terminal (such as switching between horizontal screen and vertical screen, a correlated game, and magnetometer pose calibration), and a function about vibration recognition (such as pedometer, tapping). The sensor 705 may also include a fingerprint sensor, a pressure sensor, an iris sensor, a molecular sensor, a gyroscope, a barometer, a hygrometer, a thermometer, an infrared sensor, or the like, which are not described herein.

The display unit 706 is configured to display information inputted by the user or information provided for the user. The display unit 706 may include a display panel 7061. The display panel 7061 may be configured in the form of a liquid crystal display (LCD), an organic light-emitting diode (OLED), or the like.

The user input unit 707 may be configured to receive inputted numeric or character information, and generate key signal inputs related to user settings and function control of the mobile terminal. Specifically, the user input unit 707 includes a touch panel 7071 and other input device 7072. The touch panel 7071, also known as a touch screen, may collect a touch operation of a user thereon or thereby (for example, an operation on or around the touch panel 7071 that is made by a user with a finger, a touch pen or any other suitable object or accessory). The touch panel 7071 may include two parts: a touch detection device and a touch controller. The touch detection device detects touch orientation of the user, detects a signal caused by the touch operation, and transmits the signal to the touch controller. The touch controller receives touch information from the touch detection device, converts the touch information into contact coordinates, and transmits the contact coordinates to the processor 710. The touch controller may receive a command from by the processor 710 and executes the command. In addition, the touch panel 7071 may be implemented by various types such as a resistive panel, a capacitive panel, an infrared panel, or a surface acoustic wave panel. In addition to the touch panel 7071, the user input unit 707 may include other input device 7072. Specifically, the other input device 7072 may include, but not limited to, a physical keyboard, a function key (such as a volume control key, and a switch key), a trackball, a mouse, or a joystick, which are not described herein.

Further, the display panel 7061 may be covered by the touch panel 7071. When the touch panel 7071 detects a touch operation on or near the touch panel 7071, the touch panel 7071 transmits the touch operation to the processor 710 to determine the type of the touch event, and the processor 710 provides a corresponding visual output on the display panel 7061 according to the type of touch event. Although the touch panel 7071 and the display panel 7061 are implemented as two independent components to implement the input and output functions of the mobile terminal in FIG. 7, in some embodiments, the touch panel 7071 and the display panel 7061 may be integrated to implement the input and output functions of the mobile terminal, which are not limited herein.

The interface unit 708 is an interface through which an external device is connected to the mobile terminal 700. For example, the external device may include a wired or wireless headset port, an external power (or battery charger) port, a wired or wireless data port, a memory card port, a port for connecting a device with an identity module, an audio input/output (I/O) port, a video I/O port, a headphone port, etc. The interface unit 708 may be configured to receive input (e.g., data information, power, etc.) from an external device and transmit the received input to one or more elements in the mobile terminal 700, or may be configured to transmit data between the mobile terminal 700 and the external device.

The memory 709 may be configured to store software programs and various data. The memory 709 may mainly include a program storage area and a data storage area, where the program storage area may store an operating system, an application program (such as a sound playback function, and an image playback function) required for at least one function; the data storage area may store data (such as audio data, and a phone hook) created according to the use of the mobile phone. In addition, the memory 709 may include a high-speed random access memory, and may further include a non-volatile memory, such as at least one magnetic disk storage device, a flash memory device, or other volatile solid-state storage device.

The processor 710 is a control center of the mobile terminal, which uses various interfaces and lines to connect various parts of the entire mobile terminal. The processor 710 runs or executes software programs and/or modules stored in the memory 709 and calls data stored in the memory 709, to execute various functions of the mobile terminal and process data, so as to monitor the mobile terminal as a whole. The processor 710 may include one or more processing units. Optionally, the processor 710 may integrate an application processor and a modem processor. The application processor mainly processes an operating system, a user interface, an application program, etc., and the modem processor mainly processes wireless communications. It can be understood that the foregoing modem processor may not be integrated into the processor 710.

The mobile terminal 700 may further include a power supply 711 (such as a battery) for supplying power to various components. Optionally, the power supply 711 may be logically connected to the processor 710 through a power management system, so as to implement functions, such as management of charging and discharging, and power consumption management, via the power management system.

In addition, the mobile terminal 700 may include some functional modules that are not shown, which are not described herein.

Optionally, embodiments of the present disclosure further provide a mobile terminal 700 including a processor 710, a memory 709, and a computer program stored on the memory 709 and executable on the processor 710. When the computer program is executed by the processor 710, the various processes of the processing method for reducing power consumption in the above embodiments are implemented, which can achieve the same technical effects. To avoid repetition, details are not described herein.

Embodiments of the present disclosure further provide a computer-readable storage medium. A computer program is stored on the computer-readable storage medium. When the computer program is executed by a processor, the various processes of the processing method for reducing power consumption in the above embodiments are implemented, which can achieve the same technical effects. To avoid repetition, details are not described herein. The computer-readable storage medium is, for example, a read-only memory (ROM), a random access memory (RAM), a magnetic disk or an optical disk.

It should be noted that, in the present disclosure, the terms "include", "comprise" or any other variants thereof are meant to cover non-exclusive inclusion, so that a process, method, item or apparatus including a series of elements is not limited to those elements, and further includes other elements that are not specifically listed or that are inherent in the process, method, item or apparatus. With no other limitations, an element restricted by the phrase "include a . . . " does not exclude the existence of other identical elements in the process, method, item or apparatus including the element.

Through the descriptions of the above embodiments, those skilled in the art can clearly understand that the methods in the above embodiments can be implemented by means of software plus a necessary universal hardware platform, and also may be implemented by hardware, but in many cases the former is preferred. Based on this understanding, the technical solution of the present disclosure that is essentially or contributes to the conventional technologies can be embodied in the form of a software product that is stored in a storage medium (such as a ROM/RAM, a magnetic disk, or an optical disc), which includes several instructions for enabling a terminal (which may be a mobile phone, a computer, a server, an air conditioner, or a network device) to execute the method described in the embodiments of the present disclosure.

The embodiments of the present disclosure are described above with reference to the accompanying drawings, but the present disclosure is not limited to the specific implementations described above. The specific implementations described above are merely schematic and are not restrictive. Those skilled in the art at the inspiration of the present disclosure can obtain many forms without departing from the principle of the present disclosure and the protection scope of the claims, and these forms shall all fall within the protection of the present disclosure.

What is claimed is:

1. A processing method for reducing power consumption, applied to a mobile terminal comprising a sensor, a touch screen coprocessor and a sensor coprocessor, wherein the sensor is connected to the touch screen coprocessor and the sensor coprocessor, an operating power consumption of the touch screen coprocessor is lower than an operating power consumption of the sensor coprocessor, and the method comprises:

controlling the sensor coprocessor to enter a dormant state, in a case that the mobile terminal is in a screen-off state;

receiving a trigger instruction transmitted by the touch screen coprocessor, wherein the trigger instruction is transmitted when data collected by the sensor connected to the touch screen coprocessor meets a predetermined trigger condition; and controlling the mobile terminal to perform a function corresponding to the trigger instruction;

wherein the function corresponding to the trigger instruction is a screen-light-up function, and the controlling the mobile terminal to perform the function corresponding to the trigger instruction comprises: controlling the mobile terminal to light up a screen;

wherein the processing method further comprises: after controlling the mobile terminal to light up the screen, controlling the touch screen coprocessor to stop receiving the data transmitted by the sensor, and controlling the touch screen coprocessor to process data of an operation by a user on a touch screen.

2. The method according to claim 1, further comprising:
before the mobile terminal is in the screen-off state, receiving a setting instruction, wherein the setting instruction is used to instruct the mobile terminal to receive, by using the touch screen coprocessor, the data transmitted by the sensor when the mobile terminal is in the screen-off state.

3. The method according to claim 1, further comprising:
after controlling the mobile terminal to light up the screen, controlling the sensor coprocessor to enter an operating state.

4. The method according to claim 1, wherein the touch screen coprocessor is configured to determine a type of a touch operation detected by the touch screen, and provide a corresponding visual output on the display unit according to the type of touch operation.

5. The method according to claim 1, wherein the sensor comprises at least one of: a fingerprint sensor, a pressure sensor, an iris sensor, a molecular sensor, a gyroscope, a barometer, a hygrometer, a thermometer, an infrared sensor.

6. A mobile terminal, comprising a sensor, a touch screen coprocessor and a sensor coprocessor, wherein the sensor is connected to the touch screen coprocessor and the sensor coprocessor, an operating power consumption of the touch screen coprocessor is lower than an operating power consumption of the sensor coprocessor, and the mobile terminal further comprises: a processor, a memory and a computer program that is stored on the memory and executable on the processor, wherein the processor is configured to execute the computer program to:

control the sensor coprocessor to enter a dormant state, in a case that the mobile terminal is in a screen-off state;

receive a trigger instruction transmitted by the touch screen coprocessor, wherein the trigger instruction is transmitted when data collected by the sensor connected to the touch screen coprocessor meets a predetermined trigger condition; and control the mobile terminal to perform a function corresponding to the trigger instruction;

wherein the function corresponding to the trigger instruction is a screen-light-up function, and the processor is further configured to execute the computer program to: control the mobile terminal to light up a screen;

wherein the processor is further configured to execute the computer program to: after controlling the mobile terminal to light up the screen, control the touch screen coprocessor to stop receiving the data transmitted by the sensor, and control the touch screen coprocessor to process data of an operation by a user on a touch screen.

7. The mobile terminal according to claim 6, wherein the processor is further configured to execute the computer program to:
before the mobile terminal is in the screen-off state, receive a setting instruction, wherein the setting instruction is used to instruct the mobile terminal to receive, by using the touch screen coprocessor, the data transmitted by the sensor when the mobile terminal is in the screen-off state.

8. The mobile terminal according to claim 6, wherein the processor is further configured to execute the computer program to:
after controlling the mobile terminal to light up the screen, control the sensor coprocessor to enter an operating state.

9. A non-transitory computer-readable storage medium, wherein a computer program is stored thereon, and the computer program is executed by a processor to: perform steps of the method according to claim 1.

10. The non-transitory computer-readable storage medium according to claim 9, wherein the computer program is executed by the processor to:
before the mobile terminal is in the screen-off state, receive a setting instruction, wherein the setting instruction is used to instruct the mobile terminal to receive, by using the touch screen coprocessor, the data transmitted by the sensor when the mobile terminal is in the screen-off state.

11. The non-transitory computer-readable storage medium according to claim 9, wherein the computer program is executed by the processor to:
after controlling the mobile terminal to light up the screen, control the sensor coprocessor to enter an operating state.

* * * * *